April 16, 1940.  E. W. BACKES  2,197,090
WEAR COMPENSATING RAIL JOINT
Filed March 25, 1938  4 Sheets-Sheet 2
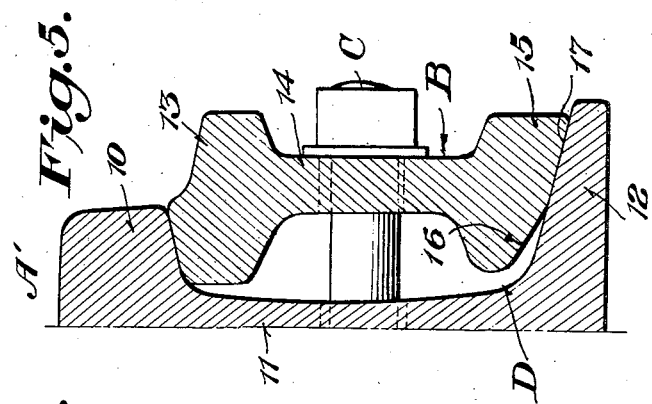
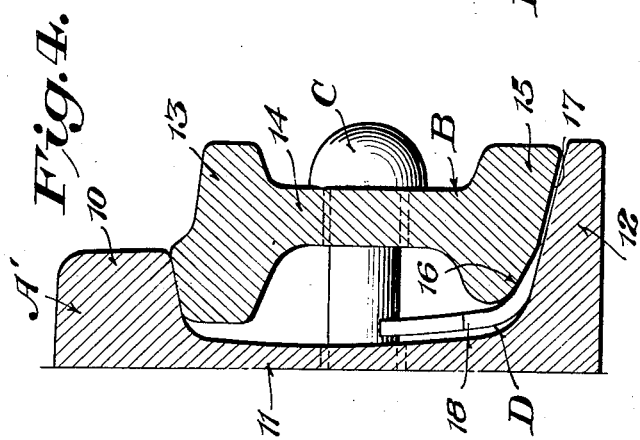
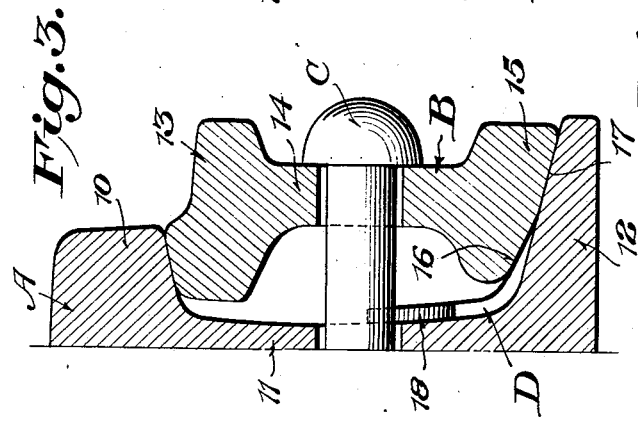
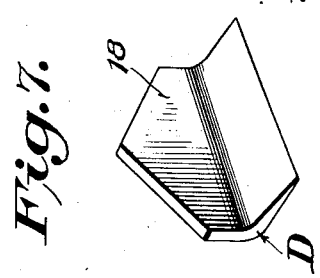
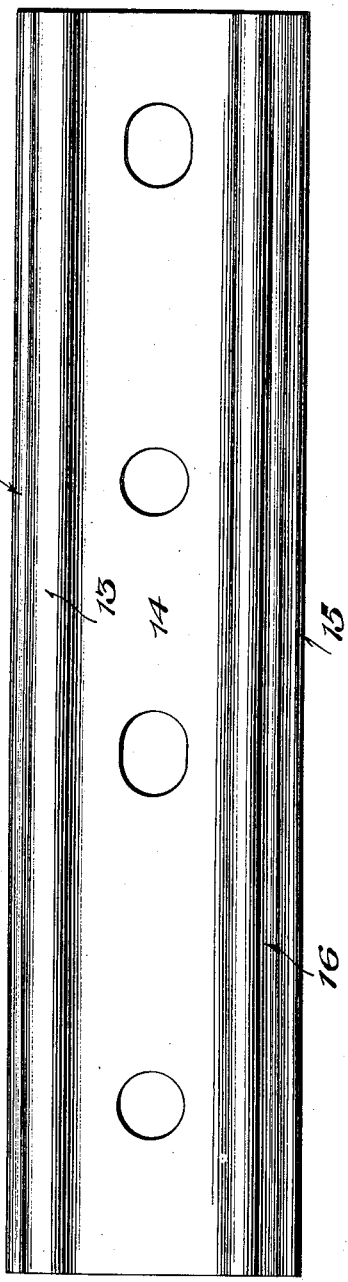
Inventor
E. W. Backes,
By D. P. Wolhaupter
Attorney

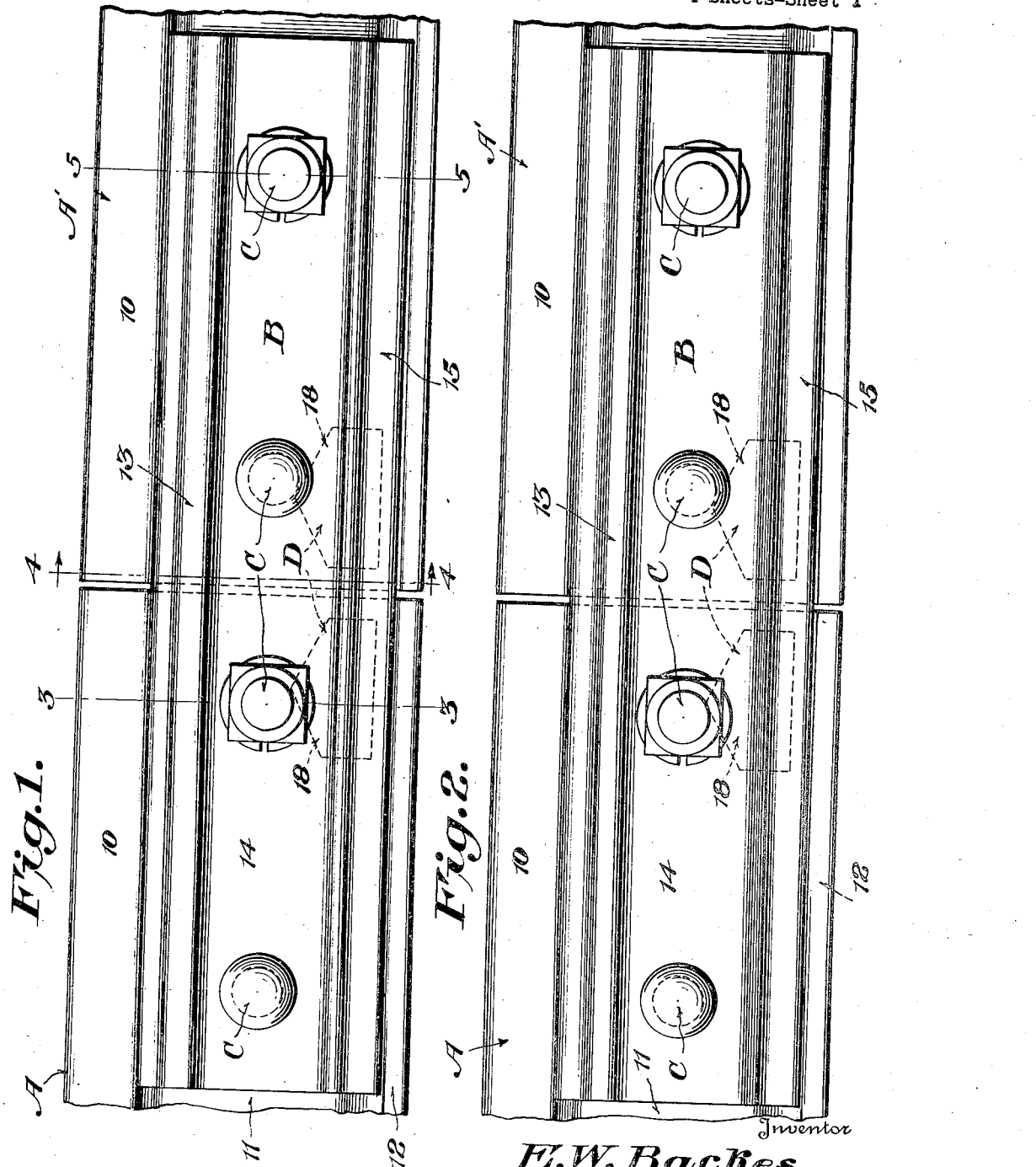

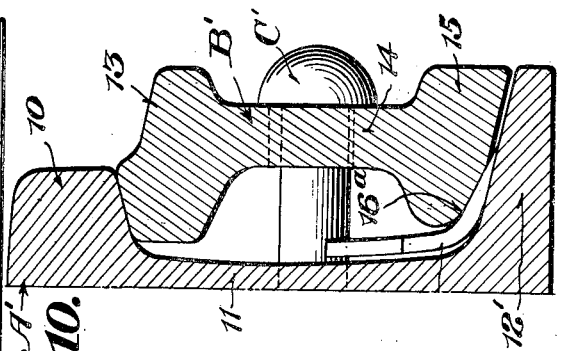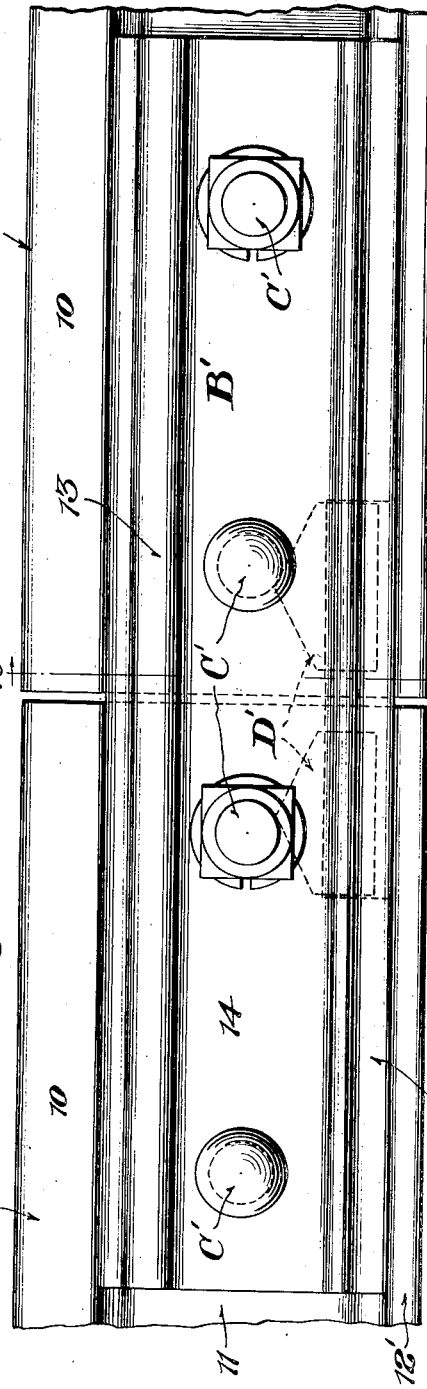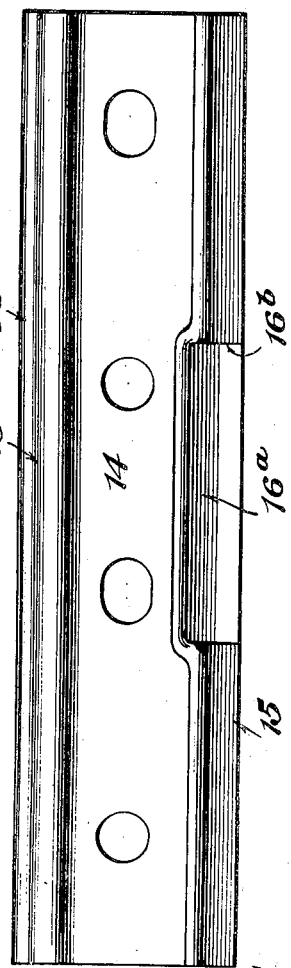

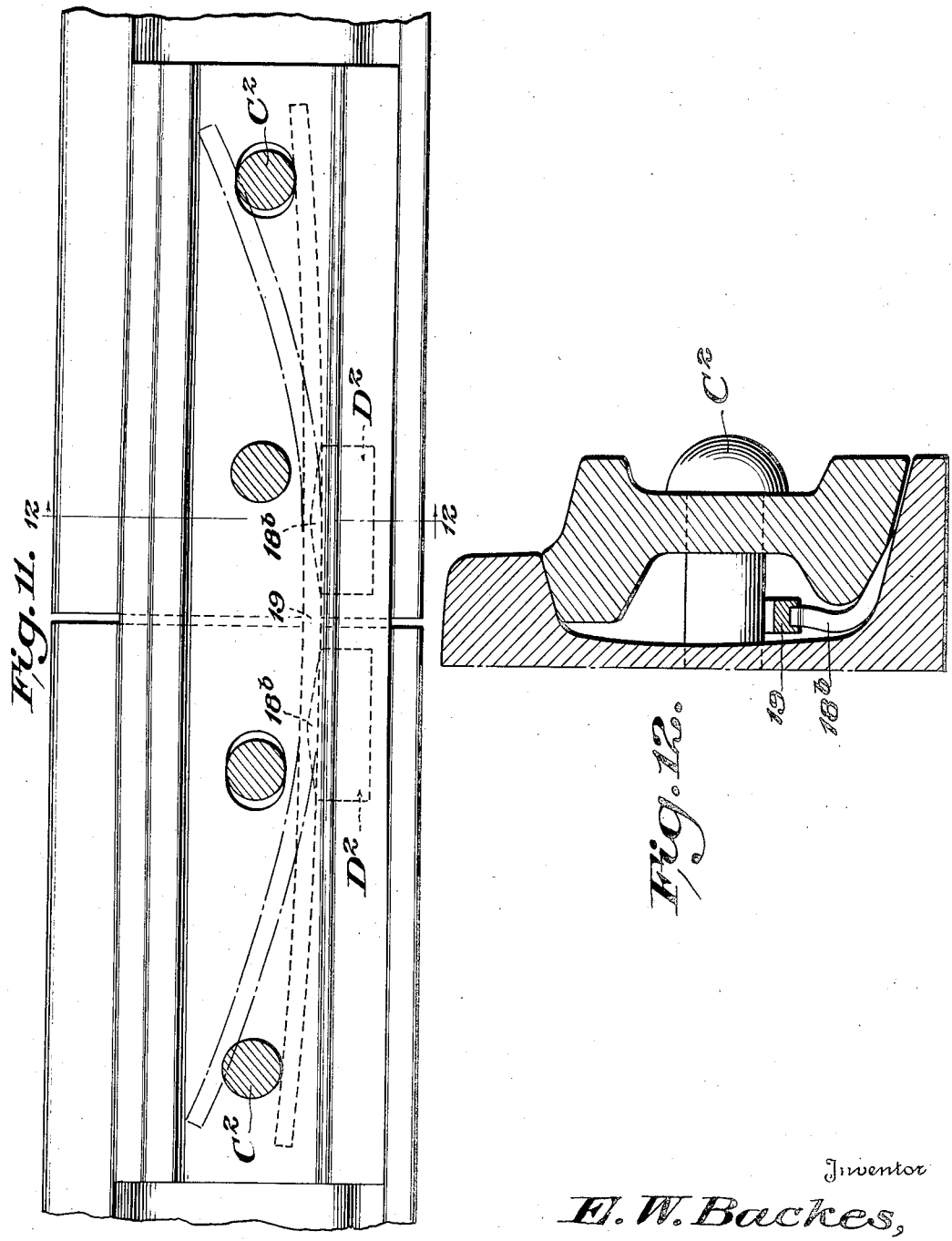

Patented Apr. 16, 1940

2,197,090

UNITED STATES PATENT OFFICE 2,197,090

WEAR COMPENSATING RAIL JOINT

Edward W. Backes, Chicago, Ill., assignor to Poor & Company, New York, N. Y., a corporation of Delaware Application March 25, 1938, Serial No. 198,117

2 Claims. (Cl. 238—244)

This invention relates to rail joints, and has for its general object to provide a simple means to compensate for differences in fishing height between rails and a connecting splice bar, whether such differences are due to manufacturing imperfections or to wear, to the end that rail joints may be made tight initially, and may be maintained tight, and their life prolonged.

As is well known, abutting rail ends often vary slightly in their fishing heights, even in the case of new rails. In constructing a joint in such cases the end of the splice bar that is associated with the rail of higher fishing height may be flexed inwardly sufficiently to tightly fit the rail fishing surfaces, but since the medial portion of the bar is held by the rail of lower fishing height against being drawn inwardly into tight fitting relationship with the end portion of the rail of higher fishing height, it is not possible, simply by tensioning the joint bolts, to obtain a tight fit between the medial portion of the bar and the end portion of the rail of higher fishing height. Therefore, in an ordinary rail joint as originally constructed, and in any case where there is a difference in the fishing heights of the connected rails, there usually exists more or less looseness between the medial portion of the splice bar and the end portion of the rail of higher fishing height. Such looseness is conducive to rapid wear and loosening of the entire joint, and as wear occurs the difference in the fishing heights of the rails becomes more pronounced, with the result that the rate at which wear occurs progressively increases, despite periodic tightening of the joint bolts. Accordingly, the general object of the present invention is, more particularly, to provide a simple means whereby a tight fit may be obtained, and maintained, between the medial portion of a splice bar and the end portions of a pair of rails, despite a difference in the fishing heights of the rails, whether such difference in fishing height is due to imperfect manufacture of the rails or develops with wear.

Another object of the invention is to provide a simple means which not only is effective to accomplish the purpose stated, but which is effective to compensate for wear between the medial portion of the splice bar and the end portions of the rails even in cases where there does not exist a difference in the fishing heights of the rails.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 1 is a side elevation of a rail joint constructed in accordance with one practical embodiment of the invention.

Figure 2 is a view similar to Fig. 1 illustrating a worn rail joint tightened by means provided in accordance with the invention.

Figures 3, 4 and 5 are cross sections on the lines 3—3, 4—4 and 5—5 respectively, of Fig. 1.

Figure 6 is an inner face view of the splice bar.

Figure 7 is a perspective view of one of the shims.

Figure 8 is a view similar to Fig. 2 illustrating an alternative form of the invention.

Figure 9 is an inner face view of the splice bar of Fig. 8 form of the invention.

Figure 10 is a cross section on the line 10—10 of Fig. 8.

Figure 11 is a view similar to Fig. 2 illustrating another alternative form of the invention; and Figure 12 is a cross section on the line 12—12 of Fig. 11.

Referring to the drawings in detail, A, A' designate the meeting end portions of a pair of rails, each including, as usual, a head 10, a web 11 and a base 12; B designates, generally, a splice bar which, within the purview of the invention, may be of any suitable type and which includes, as usual, a head 13, a web 14 and a base 15; C designates joint bolts for drawing the splice bar B into engagement with the rails, and D, D designate a pair of shims, one related to each rail, interposed between the base of the splice bar and the bases of the rails, respectively, medially of the joint.

As illustrated in Fig. 1, the fishing height of the rail A' is slightly greater than the fishing height of the rail A. This is a common occurrence and may be due to different causes. For example, in the case of new rails, there may exist slight differences in different sets of rolls, or in the adjustment of different sets of rolls, by which the rails are produced; or one of the rails may be new and the other slightly worn, or both may be worn, one more than the other. In any event, in any case where the rails have different fishing heights, however slight, it is practically impossible, by tensioning of the joint bolts, to obtain a good direct fit between the medial portion of a splice bar and the end portion of the rail of higher fishing height, because the end portion of the rail of lower fishing height prevents the medial portion of the bar from being drawn inwardly into tight engagement with the end portion of the rail of higher fishing height. Obviously, the consequent looseness between the splice bar and the rail of higher fishing height is conducive to rapid wear and deterioration of the joint.

According to the present invention, at least the inner, medial portion of the bottom or base fishing surface of the splice bar has a greater upward and inward inclination, as indicated at 16, than the top fishing surfaces of the rail flange and than the remaining portions of the bottom or base fishing surface of the splice bar which have the same inclination as the upper faces of the rail flanges. Furthermore, according to the present invention, one of the shims D is interposed between the inclined portion 16 of the splice bar and the end portion of the base of one of the rails and the other of said shims D is interposed between the said inclined portion 16 of the splice bar and the end portion of the base of the other rail, the portions of said shims which fit between the splice bar and the rail flange being of wedge shape in cross section and of sectional dimensions to fit the spaces between the inclined portion 16 of the splice bar and the upper faces of the rail flanges in the original or normal application of the splice bar to the rails. Moreover, said shims are of short length so that they do not extend to the ends of the joint, but cooperate only with the medial portion of the splice bar and with the extreme end portions of the bases of the rails. Obviously, under the influence of gravity and flexure of the joint in service, the shims tend constantly to creep outwardly and to take up any looseness or play between the splice bar and both rails, thus compensating for any initial difference in fishing height of the rails and for wear between the splice bar and the rails as wear develops.

The inclined portion 16 of the splice bar may be formed in any suitable manner and this portion may be confined to the medial portion of the bar, as illustrated in Fig. 9 of the drawings, or may extend throughout the length of the bar, as illustrated in Fig. 6 of the drawings, in which latter case it may be produced during rolling of the bar. Moreover, since in either case, the portion 17 of the under side of the base of the bar outwardly of the inclined portion 16 thereof has the same upward and inward inclination, throughout the length of the bar, as the upper face of the rail flanges, it is apparent that the bar may be used without shims and in the same manner as an ordinary bar.

Figure 3 of the drawings illustrates a tight fit between the splice bar and the rail of lower fishing height obtained by tensioning of the joint bolts; Fig. 4 illustrates the shim associated with the rail A' of higher fishing height in a position compensating for the difference in fishing height between said rail and the splice bar, and Fig. 5 illustrates a tight fit between the end of the splice bar and the rail A' of higher fishing height obtained by flexing the end of the splice bar inwardly. Figures 1, 3 and 4 further illustrate that the shims D, D may have upward extensions 18 for cooperation with the innermost pair of joint bolts to hold the shims against creeping outwardly longitudinally of the joint in the event the inclined portion 16 of the bar extends throughout the length of the bar. Moreover, said figures illustrate that the upper edge portion of the shims which cooperate with the joint bolts may be inclined so that any tendency of the shims to creep longitudinally results in the same being urged forwardly.

Figures 8 to 10 of the drawings illustrate, as at 16a, that only the medial portion of the bottom or base fishing surface of the splice bar B' has a greater upward and inward inclination than the top fishing surfaces of the rail flanges 12', and that, from said medial portion 16a to the ends of the splice bar, the said inner portion of the bottom or base fishing surface of the bar has the same upward and inward inclination as the top fishing surfaces of the rail flanges for fishing cooperation with said rail flange surfaces. The portion 16a, which is in the form of a recess, is of a length to accommodate the shims D' and may be formed in any suitable manner, as, for example by subjecting the medial portion of the bar to pressure between dies, or, alternatively, by removing metal from the bar. Obviously, the portion 16a may be confined to the inner portion of the bottom face of the bar, or it may be of a width to extend entirely, or substantially entirely, across the bottom face of the bar. In either case its ends are defined by shoulders 16b against which the outer side edges of the shims D' abut and by which said shims are held against creeping outwardly longitudinally of the joint. In other respects the joint is the same as illustrated in Figs. 1 to 7.

According to the form of the invention illustrated in Figs. 11 and 12, the construction is the same as illustrated in Figs. 1 to 7 except that there is additionally provided a spring bar 19 which is interposed between the upward extensions 18b of the shims D² and a pair of the joint bolts C², in this instance the two outermost joint bolts, and which reacts from said joint bolts to urge the shims constantly downward, and, consequently, outward due to the downward and outward inclination of the upper faces of the rail flanges. Thus, as the rails and the splice bars are flexed by the passage of loads over the joint, the shims are urged between the splice bar and the rail flanges under the influence of the spring bar 20 and serve to compensate for any difference in fishing height between other of the rails and the splice bar, whether such difference exists initially or develops due to wear. The spring bar 19 normally is bowed upwardly at its ends, as indicated by the dot and dash lines in Fig. 11 and during installation of the joint its medial portion is engaged with the tops of the portions 18b of the shims and its ends are sprung downwardly and are engaged beneath a pair of the joint bolts, whereby it is energized and tends constantly to perform its function of urging the shims downwardly and, consequently, forwardly between the splice bar and the rail flanges.

Without further description it is thought that the features and advantages of the invention will be readily apparent to those skilled in the art, and it will of course be understood that changes in the form, proportion and minor details of construction may be resorted to, without departing from the spirit of the invention and the scope of the appended claims.

I claim:

1. In a rail joint, the rails including base flanges having upwardly and inwardly inclined top surfaces, the splice bar having head loading cooperation with head portions of the rails, at least the medial portion of the bottom surface of the splice bar having a greater upward and inward inclination than the top surfaces of the rail flanges, a wedge interposed between the base of the splice bar and the rail flanges medially of the joint and effective by outward movement thereof relative to the splice bar and the rail flanges to maintain a tight fit of the splice bar with the rails, said wedge being of substantially L-shape in cross section and including a substantially vertically disposed leg interposed between the splice bar and the web of the rail, joint bolts for drawing the splice bar inwardly relative to the rails, and a flexed spring bar medially engaged with the top of the substantially vertical leg of said wedge and having its end portions each underlying one of a pair of the joint bolts and reacting therefrom to exert a constant downwardly directed force upon said wedge tending constantly to slide the latter outwardly over the upper faces of the rail flanges into wedging cooperation with said faces and the under face of the splice bar, thereby to maintain a tight fit between the splice bar and the trail.

2. In a rail joint, the rails, the splice bar, said bar and rails having fishing surfaces at least portions of which converge outwardly, a wedge of substantially L-shape in cross section including a substantially horizontally disposed portion interposed between said portions of said fishing surfaces and a substantially vertically disposed portion interposed between the splice bar and the web of the rail, joint bolts for drawing the splice bar inwardly relative to the rails, and a flexed spring bar medially engaged with the free edge of the substantially vertically disposed leg of said wedge and having its end portions each engaged with and reacting from one of a pair of the joint bolts to constantly exert a force on said wedge tending to cause its substantially horizontally disposed portion to be slid outwardly between the converging portions of the fishing surfaces of the splice bar and the rails, whereby the joint is maintained tight.

EDWARD W. BACKES.